United States Patent
Li et al.

(10) Patent No.: US 8,006,064 B2
(45) Date of Patent: Aug. 23, 2011

(54) LOCK-FREE VECTOR UTILIZING A RESOURCE ALLOCATOR FOR ASSIGNING MEMORY EXCLUSIVELY TO A THREAD

(75) Inventors: Tianyou Li, Shanghai (CN); Jia Yang, Shanghai (CN); Qi Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 742 days.

(21) Appl. No.: 12/119,998

(22) Filed: May 13, 2008

(65) Prior Publication Data

US 2009/0287899 A1 Nov. 19, 2009

(51) Int. Cl.
*G06F 12/00* (2006.01)
(52) U.S. Cl. ........................................................ 711/172
(58) Field of Classification Search .................. None
See application file for complete search history.

(56) References Cited

U.S. PATENT DOCUMENTS 7,263,592 B2 * 8/2007 Michael ........................ 711/170

OTHER PUBLICATIONS

Damian Dechev et al., Lock-free Dynamically Resizable Arrays, Texas A&M University College Station, 12 pages ; 2006.

* cited by examiner

*Primary Examiner* — Hiep T Nguyen
(74) *Attorney, Agent, or Firm* — Schwabe, Williamson & Wyatt, P.C.

(57) ABSTRACT

Methods, systems, and articles for receiving, by a lock-free vector of a computing device, a request from a thread of the computing device to write data to the lock-free vector are described herein. In various embodiments, the lock-free vector may then determine whether the lock-free vector is growing and, if the lock-free vector is not growing, may allocate a first portion of memory of the lock-free vector exclusively to the requesting thread. In some embodiments, the allocating may comprise allocating using a resource allocator of the lock-free vector.

20 Claims, 6 Drawing Sheets

```
01  struct ArrayBuffer{
02    T* _data;
03    S_UInt32 _size;
04    volatile S_UInt32 _used;
05    volatile S_UInt32 _pending;
06    volatile S_UInt32 _growing;
07  };
```

Figure 4

```
01 s_UInt32 push_back(const T& data) {
02     do {
03         ArrayBuffer * buffer = _buffer ;
04         if (buffer->_used+1>buffer->_size) {
05             reserve(buffer->_size*2);
06             continue;
07         if (buffer->_growing)
08             continue;
09         atomic_increment((volatile int*)&buffer->_pending);
10         if (buffer->_growing) {
11             atomic_decrement((volatile int*)&buffer->_pending);
12             continue;
13         s_UInt32 used = atomic_increment((volatile int*)&buffer->_used);
14         s_UInt32 size = buffer->_size ;
15         if (used > size) {
16             atomic_decrement((volatile int*)&buffer->_pending);
17             continue;
18         } else {
19             buffer->_data[used-1] = data;
20             atomic_decrement((volatile int*)&buffer->_pending);
21             return used-1 ;
21     }while(1);
}
```

Figure 5

```
01  void reserve(S_UInt32 aSize) {
02    aSize=8>aSize?8:aSize;
03    ArrayBuffer* buffer = _buffer ;
04    if(buffer){
05      if (buffer->_size>=aSize) return;
06      while(!atomic_cas(&buffer->_growing,0,1)){
07        yield() ;
08      buffer = _buffer ;
09      if (buffer->_size>=aSize) return;
10    ArrayBuffer* nbuffer = NULL ;
11    nbuffer = static_cast<ArrayBuffer*>(_allocator->allocate(sizeof(ArrayBuffer))) ;
12    nbuffer->_data=reinterpret_cast<T*>(_allocator->allocate(aSize*sizeof(T)));
13    if(buffer){
14      T* olddata=buffer->_data;
15      mcopy(nbuffer->_data,olddata,buffer->_size*sizeof(T));
16      nbuffer->_used = buffer->_size ;
17    nbuffer->_size=aSize;
18    _buffer = nbuffer ;
    }
```

LOCK-FREE VECTOR UTILIZING A RESOURCE ALLOCATOR FOR ASSIGNING MEMORY EXCLUSIVELY TO A THREAD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

TECHNICAL FIELD

Embodiments relate to the field of data processing, in particular, to a lock-free vector using a resource allocator to assign memory exclusively to a thread.

BACKGROUND

With the advent and increasing popularity of multi-processor, multi-thread systems, new problems of resource sharing have arisen. When multiple concurrently executing threads try to write to a resource at the same time, conflicts known as race conditions may ensue. To overcome these difficulties, data structures such as semaphore locks have been associated with shared resources to allow one thread to access and write to the resource at a time. The use of locks has also given rise to other difficulties, however. If a thread holding a lock doesn't release the lock, processing on the system may be unduly slowed or halted.

To overcome the difficulties of locks, many lock-free data structures have been proposed. A lock-free structure guarantees that when multiple threads operate simultaneously on the structure, at least one thread will complete its task in a finite number of steps. Lock-free structures have also proven susceptible to data coherence issues, such as the ABA problem. The ABA problem occurs when a thread is using a resource which is supposed to be deallocated, but which has not yet been deallocated.

BRIEF DESCRIPTION OF THE DRAWINGS

Embodiments of the disclosure will be described by way of exemplary embodiments, but not limitations, illustrated in the accompanying drawings in which like references denote similar elements, and in which:

FIG. 4 illustrates an exemplary definition of a lock-free vector, in accordance with various embodiments;

FIG. 5 illustrates an exemplary fragment of logic of a push_back method of a lock-free vector, in accordance with various embodiments; and FIG. 6 illustrates an exemplary fragment of logic of a growing method of a lock-free vector, in accordance with various embodiments.

DETAILED DESCRIPTION OF ILLUSTRATIVE EMBODIMENTS

Illustrative embodiments include, but are not limited to, methods, systems, and articles for receiving, by a lock-free vector of a computing device, a request from a thread of the computing device to write data to the lock-free vector. In various embodiments, the lock-free vector may then determine whether the lock-free vector is growing and, if the lock-free vector is not growing, may allocate a first portion of memory of the lock-free vector exclusively to the requesting thread. In some embodiments, the allocating may comprise allocating using a resource allocator of the lock-free vector.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
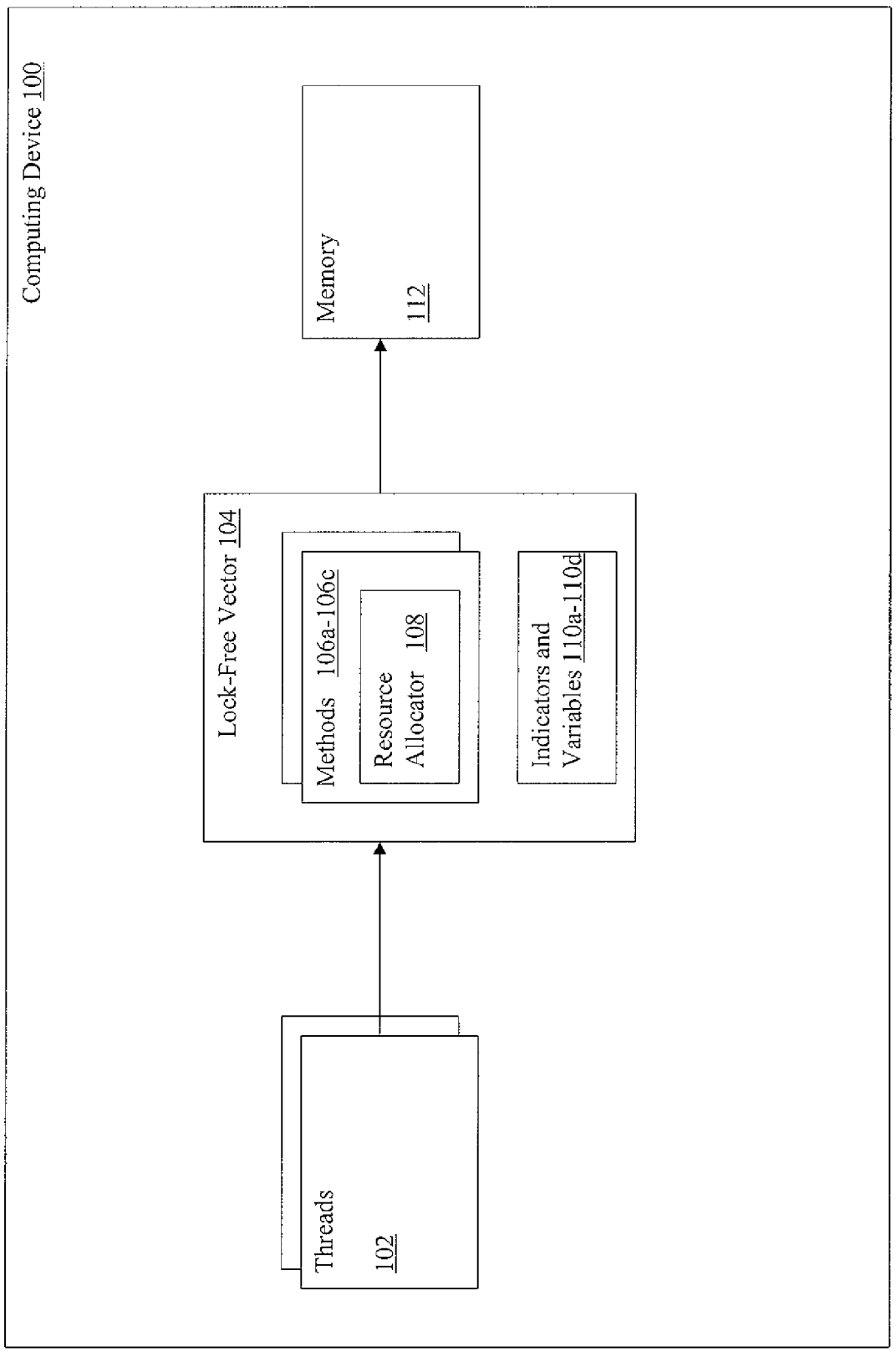
FIG. 1 illustrates an overview of various embodiments of the disclosure.

FIG. 1 illustrates an overview of various embodiments of the disclosure. As illustrated, a computing device 100 may have a lock-free vector 104 and a plurality of threads 102 attempting to read from or write to the vector 104, sometimes concurrently. To allow concurrent access without implementing a lock, vector 104 provides a plurality of methods 106a-106c, at least one of the methods including a resource allocator 108, the resource allocator 108 configured to allocate a portion of memory 112 reserved for the vector 104 exclusively to a thread 102 which has made a write request of vector 104. In various embodiments, methods 106a-106c may include methods to allow threads 102 to write to and read from vector 104, as well as a method to grow vector 104 to reserve a greater memory size 112. Also, in various embodiments, vector 104 may include a number of indicators and variables 110a-110d, such as a total size 110a of the vector 104, a count/portion 110b of the vector 104 currently being used/allocated, a counter 110c of pending write requests, and/or a flag 110d indicating whether vector 104 is growing. In other embodiments, fewer, different, or additional indicators and variables may be utilized.

Figure 3:
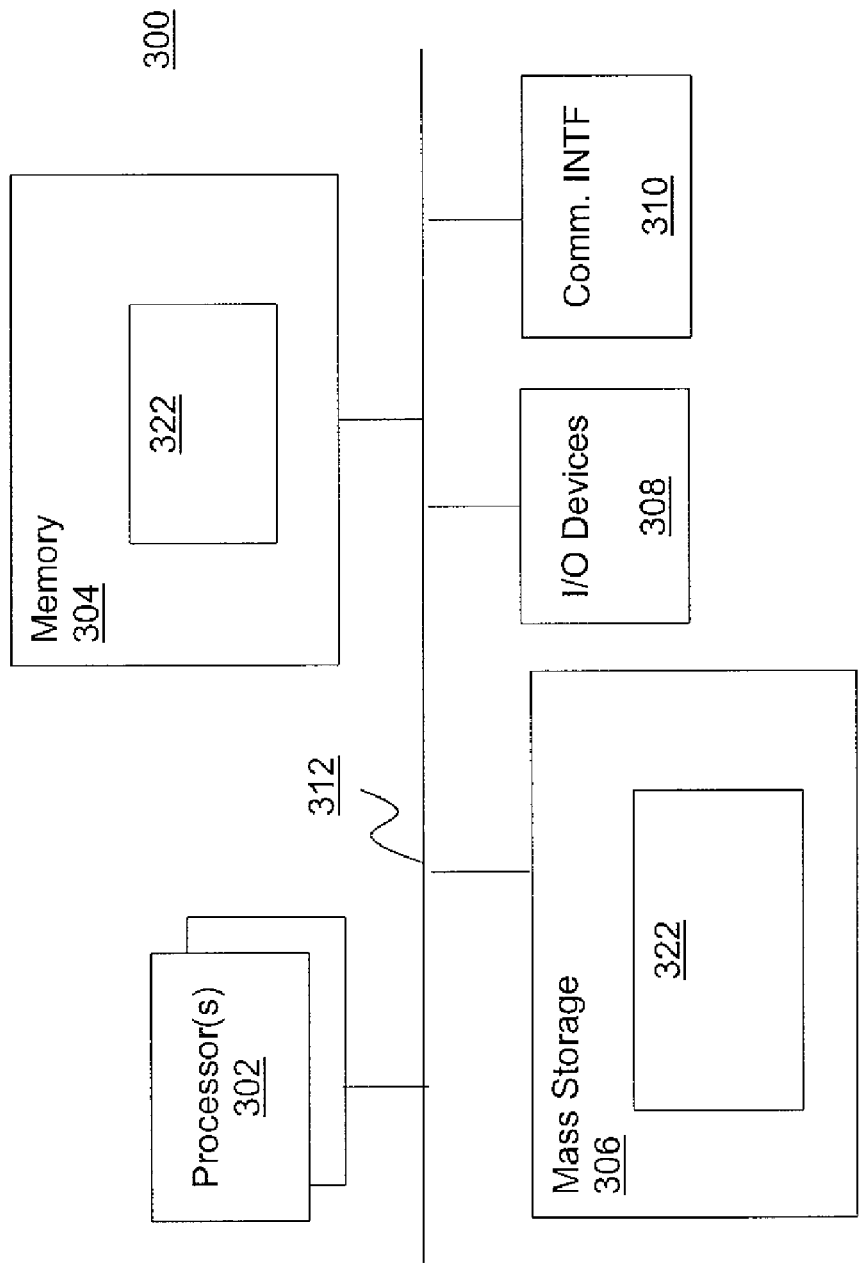
FIG. 3 illustrates an example computer system suitable for use to practice aspects of various embodiments.

In various embodiments, the computing device 100 may be any sort of computing device known in the art, except for threads 102, lock-free vector 104, methods 106a-106c, resource allocator 108, indicators and variables 110a-110d, and memory 112. The computing device(s) may be personal computers (PC), workstations, servers, routers, mainframes, modular computers within blade servers or high-density servers, personal digital assistants (PDA), entertainment centers, set-top boxes, or mobile devices. An exemplary computing device is illustrated by FIG. 3, and will be described in greater detail herein.

In some embodiments, computing device 100 may actually comprise multiple, remotely disposed computing devices. In various embodiments, where such computing devices are remotely disposed from each other, the computing devices may be communicatively connected to each other. In some embodiments, the computing devices may be connected by a networking fabric (not illustrated). Such a networking fabric may include one or more of a local area network (LAN), a wide area network (WAN), and the Internet, as is known in the art. In one embodiment, the networking fabric may comprise a private network or a virtual private network (VPN) which may utilize tunneling.

As illustrated, computing device 100 may include a plurality of threads 102 operating, in one embodiment, on a plurality of processors (not shown) of computing device 100. Such threads 102 may belong to a single process or to a plurality of processes. In some embodiments, threads 102 may seek to write to or read from the same data structure by making read or write requests of the data structure. As mentioned above, threads 102 may sometimes make such requests concurrently of the same data structure. Often, threads 102 make such requests to determine or set a value stored in the data structure. In some embodiments, the threads may make read or write requests using public methods of the data structure that provide an interface for threads 102.

In various embodiments, threads 102 may also be configured to determine the available memory 112 of a data structure, such as lock-free vector 104. In such embodiments, vector 104 may provide one or more methods 106a-106c, some or all of which may be public methods, for determining the size 110a of the vector 104 and the portion 110b of the vector 104 being used. In some embodiments, a thread 102 may invoke one or more of such methods 106a-106c and may utilize the returned size 110a and portion 110b to determine a likelihood of success of a potential write request to be made by the thread 102. For example, if portion 110b and size 110a are equal, the thread 102 may determine that the likelihood of success of the write request is low, may wait a pre-determined time, and may query the size 110a and portion 110b again. If, on the other hand, size 110a is greater than portion 110b, the thread 102 may proceed with the write request.

As illustrated and described above, lock-free vector 104 may be a data structure with one or more methods 106a-106c and indicators and variables 110a-110d. In some embodiments, lock-free vector may be an instance of a dynamic array, similar to the standard template library (STL) vector class. Vector 104 may have public and/or private methods, such as methods 106a-106c. Vector 104 may also have public and/or private member variables, such as indicators and values 110a-110d. Further, vector 104 may comprise a data buffer or set of elements, each element storing or pointing to a data value. As is well known in the art, public methods and variables are not hidden by implementation from other methods/threads/processes, the public methods providing an interface to the other methods/threads/processes. Vector 104 may also be associated with reserved memory 112 of computing device 100, the reserved memory 112 storing the buffer or element values of the vector 104.

In various embodiments, vector 104 may have at least three methods 106a-106c: a push_back or write method 106a, a read method 106b, and a grow method 106c. In some embodiments, the grow method 106c may be a private method invoked by the push_back method 106a, and the push_back and write methods 106a and 106b may be public methods which may be called by a thread 102. Also, in some embodiments, the push_back method 106a may include a resource allocator 108. As described above, the resource allocator 108 may allocate a portion of memory 112 exclusively to a thread 102 which has invoked the push_back method 106a. Further, in various embodiments, indicators and variables 110a-110d may include publicly accessible size 110a and portion 110b variables, as described above, as well as a private counter variable 110c and private flag indicator 110d to indicate whether the vector 104 is growing.

In some embodiments, vector 104 may receive a read request when a thread 102 invokes the vector's publicly available read method 106b. In one embodiment, the read method 106b may include an optional index parameter to allow the thread 102 to specify an index of a vector 104 element that is of interest. Upon receiving an invocation of read method 106b that includes an index, vector 104 may retrieve from memory 112 the value associated with that index and may return the value to the thread 102. In some embodiments, when the thread specifies no index parameter, the vector 104 may return the complete buffer or element values, or a pointer thereto, of the vector 104 to the requesting thread 102. In other embodiments, when the thread specifies no index parameter, the vector 104 may return a value of a first element of vector 104, a last element of vector 104 or an element selected at random from vector 104. In various embodiments, vector 104 may perform the read request regardless of whether vector 104 is concurrently performing a write request or is in a growing state.

In various embodiments, lock-free vector 104 may receive a write request when a thread 102 invokes a push_back method 106a or write method 106b of vector 104. In one embodiment, the thread 102 may include the value it desires to write to vector 104 as a parameter of the push_back method 106a invocation. In other embodiments, it may not include any parameters and may only write to vector 104 after receiving an index or pointer to an element of vector 104 when the push_back method 106a returns.

Upon receiving a write request, the push_back method 106a of vector 104 may first increment a pending-requests-counter variable 110c to indicate that an additional request is pending. In various embodiments, push_back method 106a may then determine whether vector 104 is growing. To determine whether vector 104 is growing, push_back method 106a may analyze the flag indicator 110d of vector 104. If the flag indicator 110d indicates that vector 104 is growing, push_back method 106a may return a null value or other indicator to thread 102 to indicate that the write request did not succeed, effectively blocking the write request. In some embodiments, push_back method 106a may then also decrement the pending requests counter 110c.

If the flag indicator 110d indicates that vector 104 is not growing, push_back method 106a may then compare the size 110a of the vector 104 to the portion used 110b. If size 110a is greater than portion 110b, push_back method 106a may invoke resource allocator 108 to allocate an element or portion of memory 112 exclusively to the requesting thread 102. In some embodiments, resource allocator 108 may be a separate data structure with methods invocable by push_back method 106a, the separate data structure storing a mapping of threads 102 and the vector 104 elements which have been exclusively allocated to them, thus ensuring that the same element/portion of memory 112 is not reallocated to another thread 102 during runtime. In other embodiments, resource allocator 108 may include one or more methods and/or variables of vector 104. If the data to be written was provided by the thread 102 as a parameter, the push_back method 106a or resource allocator 108 may write the data to the memory 112 allocated by resource allocator 108 and push_back method 106a may return an index or pointer to the element/memory 112 to the thread 102. If the data to be written was not provided, the push_back method 106a may simply return an index or pointer to the allocated element/memory 112 to the thread 102, enabling the thread to write to the allocated element/memory 112 using the index/pointer. In some embodiments, push_back method 106a may then also decrement the pending requests counter 110c and increment or adjust the portion used variable 110b.

In various embodiments, if the size 110a is less than or equal to portion 110b, push_back method 106a may block the write request and decrement the pending requests counter. The push_back method 106a may then wait until the pending requests counter indicates that no more requests are pending, set the flag indicator 110d to indicate that the vector 104 is growing, and invoke the grow method 106c of vector 104.

In some embodiments, the grow method 106c of lock-free vector 104 may first reserve a new portion of memory of computing device 100. In one embodiment, the amount of memory reserved may be twice the size of memory 112. For example, if memory 112 was 256 kilobytes, grow method 106c may reserve 512 kilobytes as the new memory 112. Upon reserving new memory 112, grow method 106c may copy contents of vector 104, such as the buffer/element values stored in the previous memory 112, to the new memory 112. In some embodiments, grow method 106c may then reset the size 110a of vector 104. For example, if the previous size of vector 104 was one hundred elements and the grow method 106c has doubled the memory 112, grow method 106c may reset the size 110a to two hundred elements. If the portion used variable 110b also is a counter of elements, grow method 106c may leave it at its current value. If, however, the portion used variable 110b is a percentage, grow method 106c may divide the value of the portion used variable 110b in half. In various embodiments, grow method 106c may then set the flag indicator 110d to indicate that the vector 104 is no longer growing, and may return to push_back method 106a.

In other embodiments, if the size 110a is less than or equal to portion 110b, push_back method 106a may instead wait until the grow method 106c has finished growing vector 104. In such embodiments, push_back method 106a may then use resource allocator 108 to allocate a portion of the new memory 112 exclusively to the requesting thread 102, may decrement the pending requests counter, and increase/adjust the portion used variable 110b, as described above.

Figure 2:
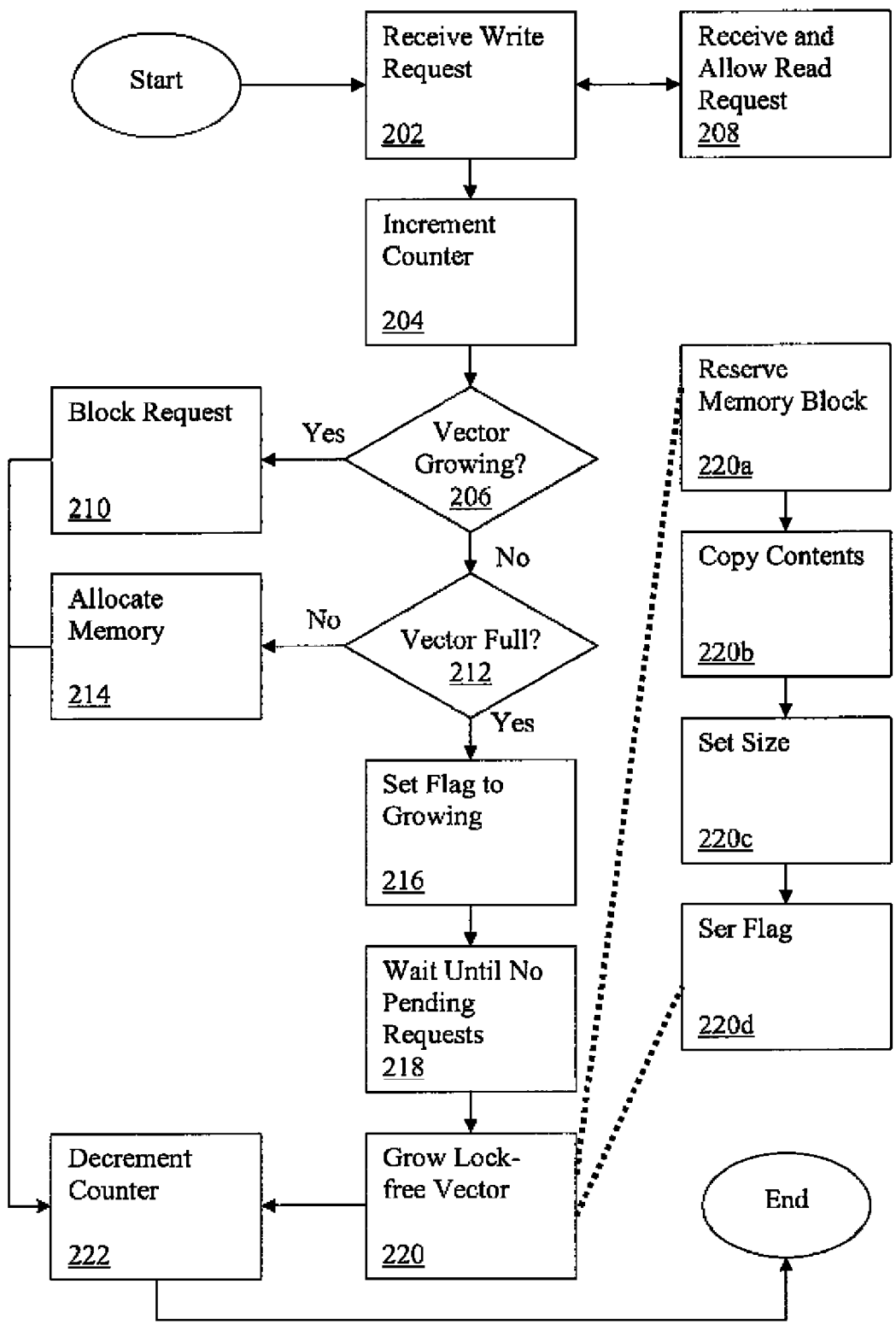
FIG. 2 illustrates a flow chart view of selected operations of the methods of various embodiments.

FIG. 2 illustrates a flow chart view of selected operations of the methods of various embodiments. As illustrated, a lock-free vector of a computing device may receive a request from a thread of the computing device to write data to the lock-free vector, block 202. Upon receiving such a request, the lock-free vector may increment a pending request counter of the lock-free vector, block 204. The lock-free vector may then determine whether the lock-free vector is growing, block 206. In some embodiments, the determining may comprise examining a flag of the lock-free vector. In various embodiments, if the lock-free vector is growing, the lock-free vector may block the received request, block 210. In some embodiments, the lock-free vector may then decrement the pending request counter, block 222.

Also, as illustrated, the lock-free vector may receive a read request from a second thread, the read request being received simultaneously with the write request, and may, in response, allow the read request, block 208. In some embodiments, the allowing may comprise allowing the read request regardless of whether or not the lock-free vector is growing.

In various embodiments, the lock-free vector may then determine whether a utilized portion of the lock-free vector is equal to or greater than a first size of the lock-free vector, block 212. If the utilized portion of the lock-free vector is not equal to or greater than a first size of the lock-free vector and if the lock-free vector is not growing, the lock-free vector may allocate a first portion of memory of the lock-free vector exclusively to the requesting thread, block 214. In some embodiments, the allocating may comprise allocating using a resource allocator of the lock-free vector. In some embodiments, the lock-free vector may then decrement the pending request counter, block 222.

As illustrated, if the utilized portion of the lock-free vector is equal to or greater than a first size, the lock-free vector may then set a flag to indicate that the lock-free vector is growing, block 216. The lock-free vector may then wait until a pending request counter of the lock-free vector indicates that no requests are pending, block 218. When the pending request counter indicates that no requests are pending, the lock-free vector may then grow itself to have a second size, the second size being greater than the first size, block 220. In some embodiments, the growing may include reserving a memory block accommodating the second size, block 220a, copying contents of the lock-free vector to the memory block, block 220b, setting the first size to equal the second size, block 220c, and setting the flag to indicate that the lock-free vector is not growing, block 220d. In various embodiments, the lock-free vector may then decrement the pending request counter, block 222.

FIG. 3 illustrates an example computer system suitable for use to practice aspects of various embodiments. As shown, computing system 300 includes a number of processors or processor cores 302, and system memory 304. For the purpose of this application, including the claims, the terms "processor" and "processor cores" may be considered synonymous, unless the context clearly requires otherwise. Additionally, computing system 300 includes mass storage devices 306 (such as diskette, hard drive, compact disc read only memory (CDROM), a disc storage device, and so forth), input/output devices 308 (such as display, keyboard, cursor control and so forth) and communication interfaces 310 (such as network interface cards, modems and so forth). The elements are coupled to each other via system bus 312, which represents one or more buses. In the case of multiple buses, they are bridged by one or more bus bridges (not shown).

Each of these elements performs its conventional functions known in the art. In particular, system memory 304 and mass storage 306 may be employed to store a working copy and a permanent copy of the programming instructions implementing one or more aspects of the above described teachings to practice the various embodiments, herein collectively denoted as 322. The various components may be implemented by assembler instructions supported by processor(s) 302 or high-level languages, such as, for example, C, that can be compiled into such instructions.

The permanent copy of the programming instructions may be placed into permanent storage 306 in the factory, or in the field, through, for example, a distribution medium (not shown), such as a compact disc (CD), or through communication interface 310 (from a distribution server (not shown)). That is, one or more distribution media having an implementation of the agent program may be employed to distribute the agent and program various computing devices.

The constitution of these elements 302-312 are known, and accordingly will not be further described.

In embodiments of the present invention, an article of manufacture (not illustrated) may be employed to implement one or more methods as disclosed herein. For example, in exemplary embodiments, an article of manufacture may comprise a storage medium and a plurality of programming instructions stored on the storage medium and configured to program a computing device with a lock-free vector, wherein the lock-free vector is configured to receive a request from a thread executing on the computing device to write data to the lock-free vector. In various embodiments, the lock-free vector may also be configured to determine, in response, whether a utilized portion of the lock-free vector is equal to or greater than a first size of the lock-free vector. Also, the lock-free vector may be configured to, if the utilized portion equals or exceeds the first size, block the received request, and grow itself to have a second size, the second size being greater than the first size.

FIG. 4 illustrates an exemplary definition of a lock-free vector, in accordance with various embodiments. As illustrated a lock-free vector named "ArrayBuffer" may be defined as including a pointer to data associated with the data type 'T' (such the elements of the lock-free vector). Also, the lock-free vector may include variables such as "_size", "_used", "_pending" and "_growing", which may correspond in some embodiments to the size, portion, pending request counter and flag variables and indicators 110a-110d described above. In some embodiments, such a definition of a lock-free vector may also include declarations of methods of the lock-free vector (not shown in FIG. 4), such as the push_back, read, and grow methods 106a-106c described above.

FIG. 5 illustrates an exemplary fragment of logic of a push_back method of a lock-free vector, in accordance with various embodiments. In various embodiments, the push_back method logic shown in FIG. 5 may comprise all or a portion of the push_back method 106a described above in greater detail.

FIG. 6 illustrates an exemplary fragment of logic of a growing method of a lock-free vector, in accordance with various embodiments. In various embodiments, the grow (shown as "reserve") method logic shown in FIG. 6 may comprise all or a portion of the grow method 106c described above in greater detail.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments. This application is intended to cover any adaptations or variations of the embodiments discussed herein. Therefore, it is manifestly intended that the embodiments be limited only by the claims and the equivalents thereof.

What is claimed is:

1. A method comprising:
   receiving, by a lock-free vector of a computing device, a request from a thread of the computing device to write data to the lock-free vector;
   determining, by the lock-free vector, whether the lock-free vector is growing; and
   if the lock-free vector is not growing, allocating, by the lock-free vector, a first portion of memory of the lock-free vector exclusively to the requesting thread.

2. The method of claim 1, wherein the determining comprises examining a flag of the lock-free vector.

3. The method of claim 1, wherein the allocating comprises allocating using a resource allocator of the lock-free vector.

4. The method of claim 1, further comprising, if the lock-free vector is growing, blocking, by the lock-free vector, the received request.

5. The method of claim 1, further comprising:
   receiving, by the lock-free vector, a read request from a second thread, the read request being received simultaneously with the write request; and
   in response, allowing, by the lock-free vector, the read request.

6. The method of claim 5, wherein the allowing comprises allowing the read request regardless of whether or not the lock-free vector is growing.

7. The method of claim 1, further comprising:
   upon receiving the write request, incrementing, by the lock-free vector, a pending request counter of the lock-free vector; and
   upon completion of the write request, decrementing the pending request counter.

8. The method of claim 1, further comprising, upon receiving the write request, determining by the lock-free vector whether a utilized portion of the lock-free vector is equal to or greater than a first size of the lock-free vector.

9. The method of claim 8, further comprising, if the utilized portion equals or exceeds the first size, setting a flag of the lock-free vector to indicate that the lock-free vector is growing.

10. The method of claim 9, further comprising:
    in response to said setting, waiting until a pending request counter of the lock-free vector indicates that no requests are pending; and
    when the pending request counter indicates that no requests are pending, growing, by the lock-free vector, the lock-free vector to have a second size, the second size being greater than the first size.

11. The method of claim 10, wherein growing includes
    reserving a memory block accommodating the second size,
    copying contents of the lock-free vector to the memory block,
    setting the first size to equal the second size, and
    setting the flag to indicate that the lock-free vector is not growing.

12. An article of manufacture comprising:
    a storage medium; and
    a plurality of programming instructions stored on a storage medium and configured to program a computing device with a lock-free vector, wherein the lock-free vector is configured to
      receive a request from a thread executing on the computing device to write data to the lock-free vector,
      determine, in response, whether a utilized portion of the lock-free vector is equal to or greater than a first size of the lock-free vector, and
      if the utilized portion equals or exceeds the first size,
        block the received request, and
        grow itself to have a second size, the second size being greater than the first size.

13. The article of claim 12, wherein the lock-free vector is further configured to, if the utilized portion equals or exceeds the first size, set a flag of the lock-free vector to indicate that the lock-free vector is growing.

14. The article of claim 12, wherein the lock-free vector is further configured to reserve a memory block accommodating the second size, copy contents of the lock-free vector to the memory block, set the first size to equal the second size, and set the flag to indicate that the lock-free vector is not growing.

15. The article of claim 12, wherein the lock-free vector is further configured to, prior to said growing, wait until a pending request counter of the lock-free vector indicates that no requests are pending.

16. The article of claim 15, wherein the lock-free vector is configured to perform the growing only if the pending request counter indicates that no requests are pending.

17. A computing device comprising:
- a processor;
- a keyboard coupled to the processor;
- memory coupled to the processor; and
- a lock-free vector, to be disposed in said memory during operation, including a resource allocator configured to allocate a first portion of memory of the lock-free vector exclusively to a thread requesting an operation of the lock-free vector, if the lock-free vector is determined to be not growing at the time of request.

18. The computing device of claim 17, wherein the lock-free vector is configured to block the received request if the lock-free vector is growing.

19. The computing device of claim 17, wherein the lock-free vector is configured to
- receive a read request from another thread, the read request being received simultaneously with the operation request, and
- I in response, allow the read request.

20. The computing device of claim 17, wherein the lock-free vector is configured to
- upon receiving the write request, increment a pending request counter of the lock-free vector, and
- upon completion of the write request, decrement the pending request counter.

* * * * *

UNITED STATES PATENT AND TRADEMARK OFFICE
CERTIFICATE OF CORRECTION

| | | |
|---|---|---|
| PATENT NO. | : 8,006,064 B2 | Page 1 of 1 |
| APPLICATION NO. | : 12/119998 | |
| DATED | : August 23, 2011 | |
| INVENTOR(S) | : Tianyou Li | |

It is certified that error appears in the above-identified patent and that said Letters Patent is hereby corrected as shown below:

Col. 10, Line 9, "I in response," should read --in response,--

Signed and Sealed this
Sixth Day of December, 2011

David J. Kappos
*Director of the United States Patent and Trademark Office*